(12) United States Patent
Litman et al.

(10) Patent No.: US 6,572,801 B2
(45) Date of Patent: Jun. 3, 2003

(54) METHOD OF FORMING AN INJECTION MOLDED PART HAVING A ZERO DRAFT SIDE

(75) Inventors: Alan M. Litman, Webster, NY (US); Rafael Malespin, Rochester, NY (US); Keith A. Nau, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/820,588

(22) Filed: Mar. 30, 2001

(65) Prior Publication Data

US 2002/0141781 A1 Oct. 3, 2002

Related U.S. Application Data

(60) Provisional application No. 60/257,993, filed on Dec. 22, 2000.

(51) Int. Cl.[7] .......................... B29C 41/42; B29C 44/02
(52) U.S. Cl. ............................................ 264/51; 264/334
(58) Field of Search ............................ 264/51, 334, 318

(56) References Cited

U.S. PATENT DOCUMENTS 5,279,491 A * 1/1994 VanAckeren ................ 249/141
5,814,257 A * 9/1998 Kawata et al. ............... 264/105

* cited by examiner

Primary Examiner—Allan R. Kuhns
(74) Attorney, Agent, or Firm—Richard F. Spooner

(57) ABSTRACT

An improved process for injection molding of components having zero draft sides comprising: making a mold having a zero draft cavity and an end-cap to seal the mold; injecting suitable resin material into the mold; foaming the resin material; separating the end-cap section from the cavity section of the mold; and removing the part from the mold. In particular, the zero draft process is intended for manufacture of an improved zero draft cylindrical noise attenuator for electrostatographic printers, said attenuator having a cylindrical sidewall thicker than 4 mm throughout at least most of its circumference; and a gap along the length of its long dimension.

7 Claims, 4 Drawing Sheets

METHOD OF FORMING AN INJECTION MOLDED PART HAVING A ZERO DRAFT SIDE

Priority is claimed from Provisional Patent Application No. 60/257,993, filed Dec. 22, 2000.

BACKGROUND OF THE INVENTION

The field of the proposed invention relates to a process for improved and cost effective manufacture of noise attenuator parts for electrophotographic printers, copiers, and similar reprographic devices. The invention also applies to parts made with the improved process.

Photoreceptor noise attenuators are well known in the current art for use with drum type photoreceptors, particularly where the electrophotographic system uses a biased charge roller (BCR) to charge the photoreceptor prior to imaging. Without the attenuators, imaging systems that use BCR systems squeak or otherwise emit a high pitch hum which is offensive. The high pitch noise is thought to result from both mechanical vibrations of the hard BCR against the photoreceptor and electrically induced vibrations due to the rapid AC current modulations. It is also believed that the scraping of a cleaning blade against the photoreceptor contributes to noise generation. A number of noise repression techniques are known. However, attenuators of the type disclosed herein offer a simple solution to the noise problem by providing vibration-dampening pressure against the inside diameter of the drum.

Current methods of manufacturing noise attenuators involve a simple extrusion process followed by (1) cutting the extrusion into the desired length, (2) pre-stressing the extruded piece to a specific condition; (3) annealing the extrusion to relieve residual stresses, and (4) machining the extrusion to incorporate a slit and to otherwise trim and finish the attenuator in conformance with its final tolerances. The result of these and other secondary handling and finishing operations is shown in FIG. 1 as a noise attenuator 10 that is made of solid extruded thermoplastic resin, typically PVC. The efficacy of attenuators of the type shown in FIG. 1 is determined primarily by three factors: 1) the intimacy of contact to the inside of the photoreceptor drum; 2) the mass of the attenuator; and 3) the sound dampening characteristics of the attenuator material.

As shown in FIG. 1, sidewall 2 of conventional solid-wall attenuator 10 is typically less than 4 mm thick (more typically around 3 mm) to accommodate the extrusion process. This thickness is limited in practice by several factors, including the probability of sink marks due to thermal shrinkage of thicker parts, longer cycle times due to increased cooling requirements, and an increase in cost as the amount of resin is increased. In FIG. 1, a radius 3 has been extruded during the extrusion process. Gap (or slot) 4 has been cut/routed into the extrusion. After annealing, the combination of the gap 4 and radius 3 operate to provide a spring effect to the attenuator 10 after its insertion inside a drum photoreceptor. Specifically, during assembly, compression forces are applied to attenuator 10 to close gap 4. The stress of these compression forces is absorbed mostly in radius area 3. Once inserted inside the drum, the compression forces are released, and the resin attempts to return to its non-stressed shape. However, the outside diameter of attenuator 10 is sized so that it contacts the inside diameter of the drum prior to gap 4 regaining its entire non-stressed size.

Of critical importance to the design and function of attenuator 10 is that there is substantially zero draft from one end of the attenuator to the other. Such avoidance of draft is critical in order that the attenuator make even and intimate contact with the inside of the photoreceptor drum along the entire length of attenuator 10. When attenuator 10 is made using an extrusion process, then the avoidance of draft is a natural consequence of the manufacturing process.

A practical limitation to the above extrusion process is the speed and efficiency of the process. In addition, any design improvements are limited to the direction of extrusion process or require a secondary operation. For parts made in volumes of millions per year, a more rapid and efficient process would be an injection molding process. Unfortunately, a conventional injection molding process for mass production using multi-cavity molds requires either (1) manufacture of parts with a draft (at least 1–4° draft) in order to remove the part from the mold cavity once formed and/or (2) a mold that separates into top and bottom sections along the long dimension of the cavity to free the part for removal. Either of the above characteristics makes a conventional injection molding process undesirable since any draft would need to be machined away and since a mold that separates into top and bottom parts along the long dimension of the part inevitably leaves a mold tracing or mark that also must be machined away.

It would be advantageous to create an efficient injection molding manufacturing process for noise attenuators and other parts without a draft where such process does not require any post-molding finishing. It would also be advantageous to increase the mass of the attenuator or the volume of the attenuator without the major disadvantages associated with such a design and still achieve the required sound dampening characteristics. As described above, the disadvantages include sink marks due to thermal shrinkage (common in thick walled parts over 3–4 mm in thickness), increase in weight, long cycle times and an overall higher cost of the part especially if secondary operations are required to achieve functional performance.

SUMMARY OF THE INVENTION

One aspect of the present invention is an improved process for manufacture of components having zero draft sides, comprising: (a) making an injection mold having an end-cap mold section and a cavity mold section that together form a cavity conforming to the zero draft part; (b) injecting resin material into the mold; (c) foaming the resin material; (d) separating the end-cap section from the cavity section; and (e) removing the part from the mold.

Another aspect of the present invention is an improved zero draft noise attenuator part made by a process, comprising: (a) making an injection mold having an end-cap mold section and a cavity mold section that together conform to the zero draft attenuator part; (b) injecting resin material into the mold; (c) foaming the resin material; (d) separating the end-cap section from the cavity section; and (e) removing the attenuator part from the mold.

Another aspect of the present invention is an improved zero draft cylindrical noise attenuator having a long dimension, comprising: (a) a cylindrical sidewall thicker than 4 mm throughout at least most of its circumference; and (b) a gap along the length of the long dimension.

Yet another aspect of the present invention is an electrostatographic printing engine comprising: (a) an electrostatographic imaging drum; (b) at least one noise attenuator positioned inside the imaging drum wherein the attenuator has a long dimension and comprises: (a) a cylindrical sidewall thicker than 4 mm throughout at least most of its circumference; and (b) a gap along the length of the long dimension.

BRIEF DESCRIPTION OF THE DRAWINGS

Other aspects of the present invention will become apparent as the following description proceeds and upon reference to the drawings, in which.

DETAILED DESCRIPTION OF THE DRAWINGS

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 7:
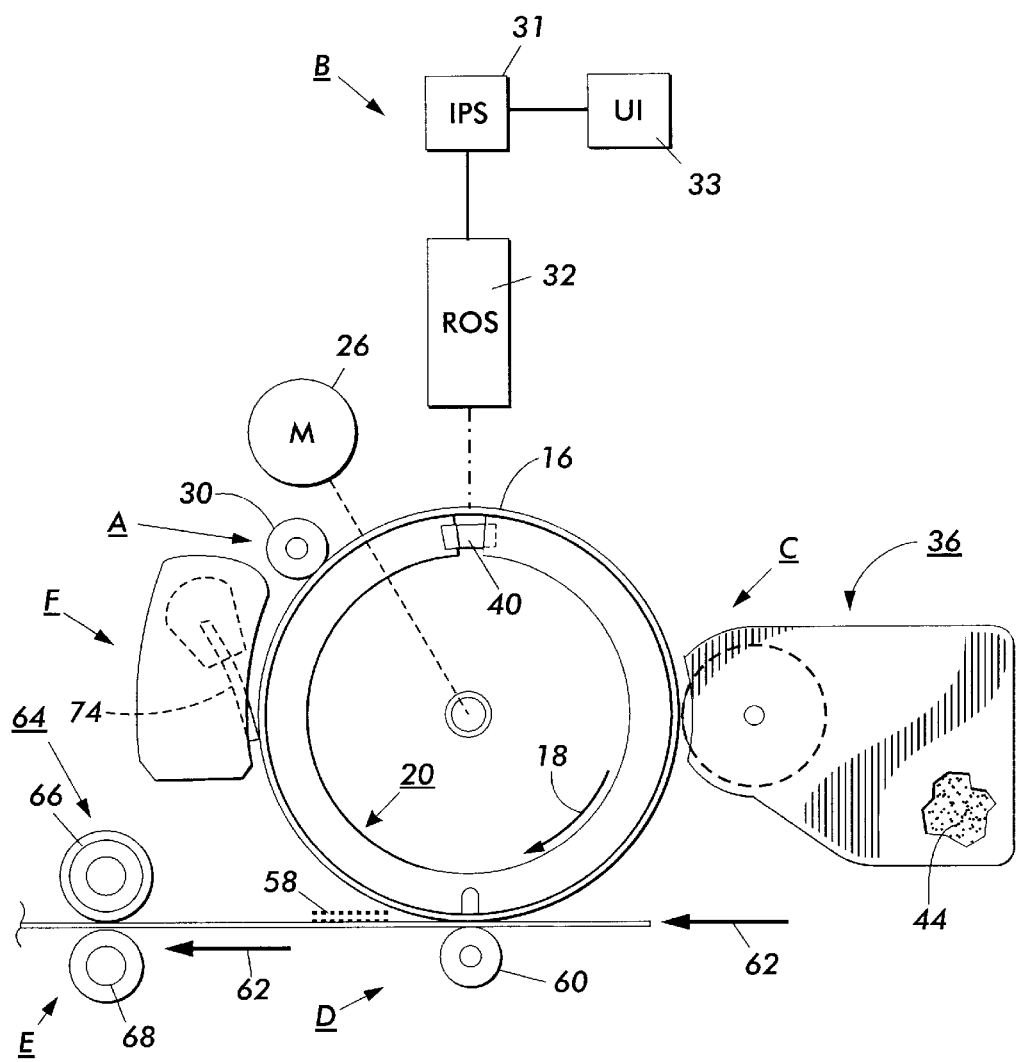
FIG. 7 is an elevated schematic description of key components of an electrophotographic engine using the present invention.

For a general understanding of the illustrative electrophotographic printing machine incorporating the features of the present invention therein, reference is made to the drawings. In the drawings, like reference numerals have been used throughout to designate identical elements. FIG. 7 schematically depicts the various components of an electrophotographic printing machine incorporating the noise attenuators of the present invention therein. Although the noise attenuators of the present invention are particularly well adapted for use in the illustrative printing machine, it will become evident that the noise attenuator design is equally well suited for use in a wide variety of machines where noise attenuation or structural reinforcement of a cylindrical object is desired. The present invention is therefore not necessarily limited in its application to the particular embodiments shown herein.

Referring now to FIG. 7, the electrostatographic printing machine of the electrophotographic type is shown employing a charge-receiving imaging drum. For an electrophotographic printing machine, such imaging drum is shown as photoconductive drum 16. The drum 16 has a photoconductive surface deposited on a conductive substrate. Drum 16 moves in the direction of arrow 18 to advance successive portions thereof sequentially through the various processing stations disposed about the path of movement thereof. Motor 26 rotates drum 16 to advance drum 16 in the direction of arrow 18. Drum 16 is coupled to motor 26, by suitable means such as a drive. An attenuator of the present invention which comprises spring 40 presses upon the inside diameter of drum 16. Usually either 2 or 3 attenuator parts are placed inside a single photoreceptor drum. Attenuator 20 and spring 40 will be further discussed below.

Initially successive portions of drum 16 pass through charging station A. At charging station A, an electrostatic charge generating device, particularly a bias charge roller (BCR) device indicated generally by the reference numeral 30, charges the drum 16 to a selectively high uniform electrical potential. The electrical potential is normally opposite in sign to the charge of the toner. Depending on the toner chemical composition, the potential may be positive or negative. Any suitable control, well known in the art, may be employed for controlling the electrostatic charge generating device 30.

Next, the charged portion of photoconductive drum 16 is advanced through exposure station B. At exposure station B, information that is indicative of the pages to be printed is transmitted to an image processing system (IPS), indicated generally by the reference numeral 31. IPS 31 is the control electronics which prepare and manage the image data flow to raster output scanner (ROS) 32, indicated generally by the reference numeral 32. A user interface (UI), indicated generally by the reference numeral 33 is in communication with the IPS 31. The UI enables the operator to control the various operator adjustable functions. The output signal from the UI is transmitted to IPS 31. The signal corresponding to the desired image is transmitted from IPS 31 to ROS 32, which creates the output copy image. ROS 32 lays out the image in a series of horizontal scan lines with each line having a specified number of pixels per inch. The ROS includes a laser having a rotating polygon mirror block associated therewith. The ROS exposes the charged photoconductive surface of the printer.

At development station C, a development system or unit, indicated generally by the reference numeral 36 advances developer materials into contact with the electrostatic latent images. The developer unit includes a device to advance developer material into contact with the latent image.

The developer unit 36, in the direction of movement of drum 16 as indicated by arrow 18, develops the charged image areas of the photoconductive surface. This developer unit contains, for example, black developer material 44 having a triboelectric charge, which charge causes colored toner particles to attach to the developer material 44. In turn, the developer/toner is attracted to charged areas of the latent image by the electrostatic field existing between the photoconductive surface and the electrically biased developer rolls in the developer unit.

A sheet of support material 58 is moved into contact with the toner image at transfer station D. The sheet of support material 58 is advanced to transfer station D by conventional sheet feeding apparatus, not shown. Preferably, the sheet feeding apparatus includes a feed roll contacting the uppermost sheet of a stack of copy sheets. Feed rolls rotate so as to advance the uppermost sheet from the stack into a chute which directs the advancing sheet of support material into contact with the photoconductive surface of drum 16 in a timed sequence so that the toner powder image developed thereon contacts the advancing sheet of support material at transfer station D.

Transfer station D includes an electrostatic charge generating device 60 which sprays ions of a suitable polarity onto the backside of sheet 58. This attracts the toner powder image from the drum 16 to sheet 58. After transfer, the sheet continues to move, in the direction of arrow 62, onto a conveyor (not shown) which advances the sheet to fusing station E.

Fusing station E includes a fuser assembly, indicated generally by the reference numeral 64, which permanently affixes the transferred powder image to sheet 58. Preferably, fuser assembly 64 comprises a heated fuser roller 66 and a pressure roller 68. Sheet 58 passes between fuser roller 66 and pressure roller 68 with the toner powder image contacting fuser roller 66. In this manner, the toner powder image is permanently affixed to sheet 58. After fusing, a chute, not shown, guides the advancing sheet 58 to a catch tray, also not shown, for subsequent removal from the printing machine by the operator. It will also be understood that other post-fusing operations can be included, for example, binding, inverting and returning the sheet for duplexing and the like.

After the sheet of support material is separated from the photoconductive surface of drum 16, the residual toner particles carried by image and the non-image areas on the photoconductive surface are removed at cleaning station F. The cleaning station F includes a blade 74.

It is believed that the foregoing description is sufficient for purposes of the present application to illustrate the general operation of an electrophotographic printing machine incorporating the noise attenuator components of the present invention.

Figure 1:
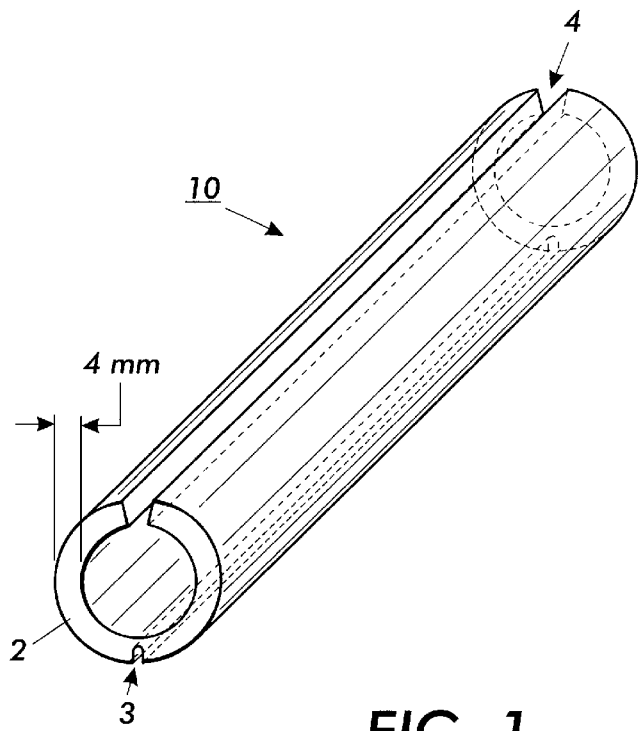
FIG. 1 is a perspective view of an attenuator of the prior art.
Figure 2:
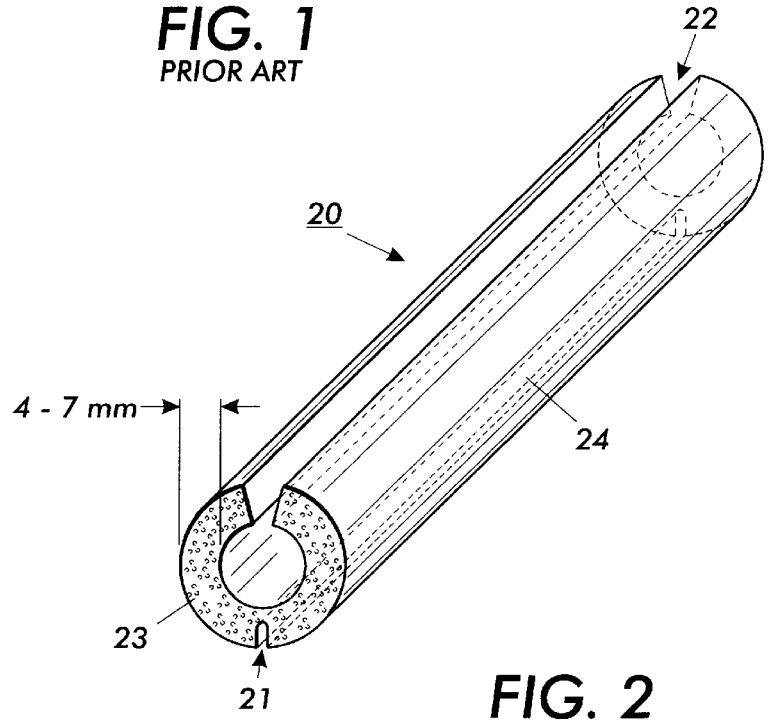
FIG. 2 is a perspective view of the attenuator of the present invention.

Turning now to FIG. 2, one aspect of the present invention is an injection molding process that enables the manufacture of attenuators with thicker sidewalls with increased sound dampening characteristics. In FIG. 2, attenuator 20 is shown with features similar to those of the prior art attenuator shown in FIG. 1. As with prior art attenuators, attenuator 20 has a radius cut 21 and a gap 22. These features operate together to enable compression during assembly followed by expansion against the inside diameter of a photoreceptor drum once compressive forces are released. A visual difference in attenuator 20 from prior art attenuators, however, is its thicker sidewall 23 which, preferably, range from 4 to 7 mm rather than the less than 4 mm of prior art attenuators. Thicker sidewalls are preferable since this thickness allows the radius 21 to vary in depth depending upon the amount of flexibility and spring action desired. In other words, the amount of spring tension can be increased or decreased simply by varying the size of radius cut 21. For sidewalls of prior art that have been less than 4 mm, manufacturing tolerances provided little ability to increase or decrease the depth of conventional radii. As will be explained below, another advantage of a thicker sidewalls of attenuator 20 is an enhanced ability to assemble an additional spring mechanism if desired.

The ability to manufacture the thicker sidewall of the present invention is due to use of an unconventional injection molding process for this application. Specifically, the present invention features use of a low pressure foam molding process and the ability of this process to enable mass production and removal of attenuator parts from endcap molds having a zero degree draft on the outside diameter which is the functional surface of the attenuator. As discussed above, zero degree draft is essential to the function of the attenuator by ensuring intimate contact between the outside surface 24 of the attenuator and the inside of the photoreceptor drum. For purposes of this application, "zero draft" refers to the outside surface 24 of the attenuator and includes normal tolerances expected during fabrication of molds as well as during the injection molding and curing process itself. Specifically, "zero draft" encompasses draft angles along all or a region of the outside surface of the attenuator of less than one degree (1°) and preferably less than one quarter of one degree (0.25°). Low pressure foam molding is sometimes referred to as "structural foam molding" and is not new in the art. Such structural foam molding process is characterized by a reduction in injection pressures from 10–20,000 psi for conventional injection molding to several 1000 psi. This results in cavity pressures of in a typical range of 300–500 psi for structural foam molding verses a range of 2000–5000 psi during a conventional molding process. As a result of the lower cavity pressures, the part has very low residual stresses.

One key advantage of using structural foam molding processes for the present application is that the low pressure enables a part to be ejected from a zero draft mold cavity with minimal effort. Where resin materials are chosen with minimal but substantially uniform shrinkage qualities, then the part is automatically freed from the sides of the mold upon shrinking during cooling. Where such minimal but uniform shrinkage is not sufficient, the mold cavities and cores can be plated with a hard release coating such as fluorocarbon carbon coatings to make the mold "non-stick." Again, the low pressure of the structural foam process enables removal under either technique since the low pressure creates minimal adhesion and friction between the part and the mold surfaces.

The use of the structural foam process enables other key advantages as well when applied to the current application: First, wall thickness 24 of attenuator 20 can be increased to 4–7 mm rather than the typical 3 mm guideline for solid plastics such as PVC. The thicker sidewalls in turn enable greater mass for sound damping. The low pressure structural foam process also minimizes any sink, or depressions, that normally result from thermal shrinkage of solid resin parts. Also, the processes of the present invention enable cycle time to be greatly reduced by enabling faster cooling and removal of each part. Specifically, experience indicates that an attenuator using the improved process can be molded with approximately a 6 mm wall thickness within 40–80 seconds using an 8 cavity mold. Under the prior art extrusion processes, equivalent cycle time is much longer since the extruded attenuator parts require additional handling and finishing operations as discussed above. Another advantage is that features can be added to the attenuator in a mold that cannot be extruded. For instance, small ribs can be added to the inside diameter of the attenuator at its end region for gripping the attenuator during insertion and removal or a chamfer can be added in one or both end regions to help insertion from inside the photoreceptor drum. Lastly, the improved process enables considerable savings in material and material costs since the foaming process enables a smaller amount of resin to occupy a larger volume.

In a preferred embodiment, the attenuator of the present invention is made with polystyrene, a thermoplastic resin. Any thermoplastic resin could be considered including, without limitation, polycarbonate, ABS, PVC, and PPO. Each of these thermoplastic materials exhibit some differences in damping efficiency, and choice of an optimal resin may be affected both by cost considerations and by the amount of sound damping that is desired. It is also believed that a thermosetting resin such as, without limitation, polyurethane, can be used for the present invention.

In addition to the choice of resin, the structural foam process requires a choice of a blowing agent to foam the plastic. Two types of blowing agents are generally known: chemical and physical. Either would work in the present invention. The physical blowing agent is simply injection of an inert gas into the molded plastic somewhere during the molding process. This could be directly input into the barrel of the injection molding machine, the nozzle of the machine or the actual mold itself. When such gas injection occurs within the mold itself, a further advantage is that the location of voids can be designed into certain locations of the part. For instance, attenuators could be designed with reinforcement ribs instead of uniformly increased wall thickness. With the above described gas assist method, voids caused by the gas injection could be designed only at the location of the thicker ribbed sections or, if desired, only the thin sections.

The chemical-type blowing agent method uses a material that decomposes during the heat of molding processes to yield an inert gas such as carbon dioxide or nitrogen which foams the molten plastic. Blowing agents may be endothermic and exothermic depending on the application. For the preferred thermoplastic applications of the present invention, typical agents the azodicarbonamide or the semicarbazides class of materials. Both are available from Ferro Corporation and other suppliers. Typical percentages are between 1 and 10% by weight of resin. Typical density reduction achieved is between 5 and 40 percent, depending on amount of blowing agent, material, geometry and the process conditions. The preferred embodiment for manufacture of attenuator 20 is a density reduction between 5 and 25 percent and preferably 5–10 percent. Blowing agents may be blended into resin either as powders blended directly with resin pellets prior to molding or may be compounded as pellets of concentrated blowing agent which are then mixed in specific ratios with resin pellets.

Any number of common injection molding machines designed to mold structural foams such as polystyrene-based foams may be used in the inventive process. One key component of such machines when used for structural foam parts formed using chemical blowing agents is a "shut of nozzle". This nozzle prevents gas generated by the thermal decomposition of the chemical blowing agent within the barrel of the machine from escaping. The shut off nozzle typically opens when the resin mixture that is melted within the barrel of the machine is injected into the mold. The nozzle activates either electrically or under pressure.

Figure 3:
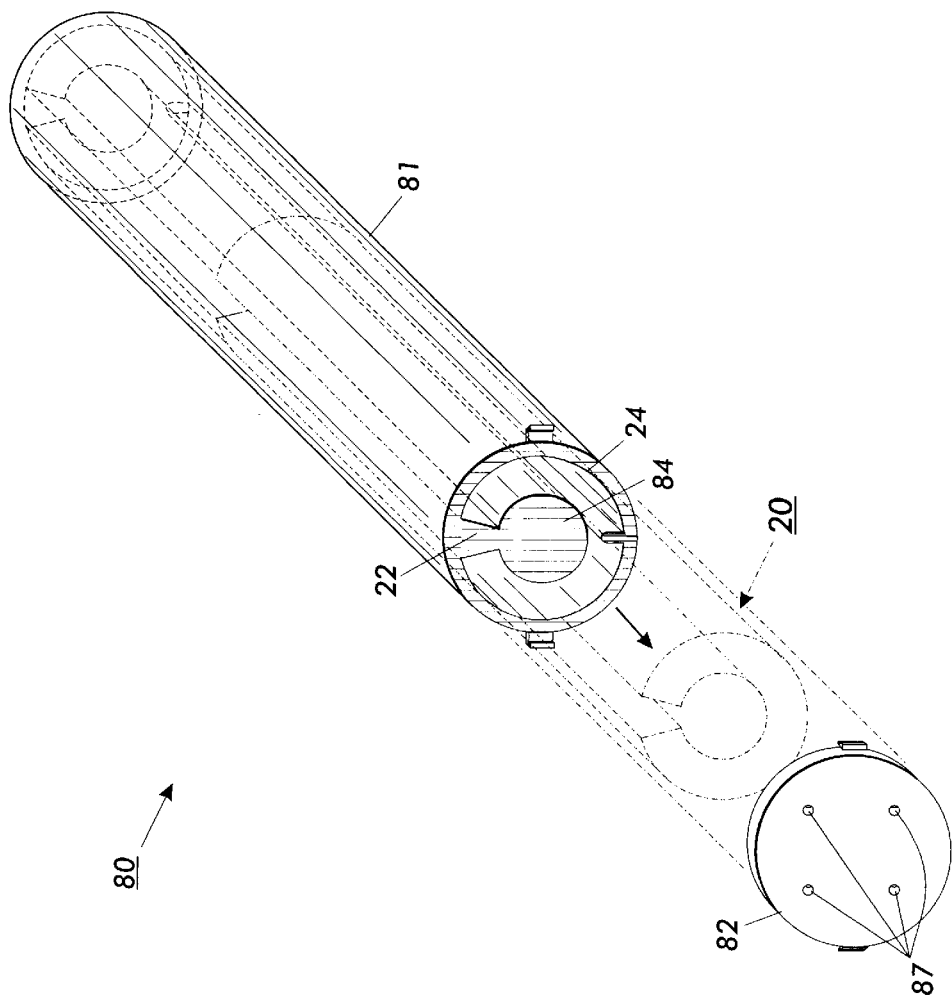
FIG. 3 is a perspective view of the end-cap mold of the inventive process with the attenuator of the present invention being removed therefrom.

Turning now to FIG. 3, a mold 80 is adapted for the present invention as shown. Mold 80 comprises a cavity section 81 defining the outside surface 24 of the attenuator, the hollow core 84 of the attenuator, as well as gap 22. Mold 80 also comprises an end-cap section 82, including a plurality of gates 87 for injecting resin. When end-cap 82 is mounted and sealed onto cavity section 81, all features of attenuator 20 are defined without the need for further machining after ejection of the finished part. An alternative mold configuration may comprise a cavity section defining the outer surface of attenuator 20 and an end-cap section having a core for defining the inside surface of the attenuator. The end-cap section 82 is inserted into the cavity section 81, and either cavity section 81 or end-cap section 82 comprises a cut-out section for defining gap 22. Although shown as a mold for a single part, mold 80 is preferably a multi-cavity mold of the so-called "3 plate" variety in which the runner detaches automatically from the part when the mold is opened. A hot runner mold would also work well. In FIG. 3, attenuator 20 of FIG. 2 is shown being removed from cavity section 81 of mold 80 after the end-cap section 82 has been lifted.

Figure 4:
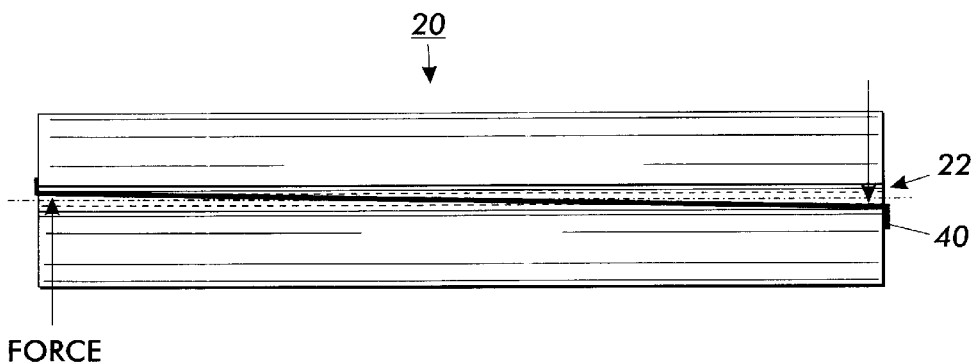
FIG. 4 is an elevated orthogonal view of an embodiment of the present invention having a mechanical spring to help spread the attenuator.
Figure 5:
FIG. 5 is a perspective view of the a spreader spring for use in an embodiment of the present invention.
Figure 6:
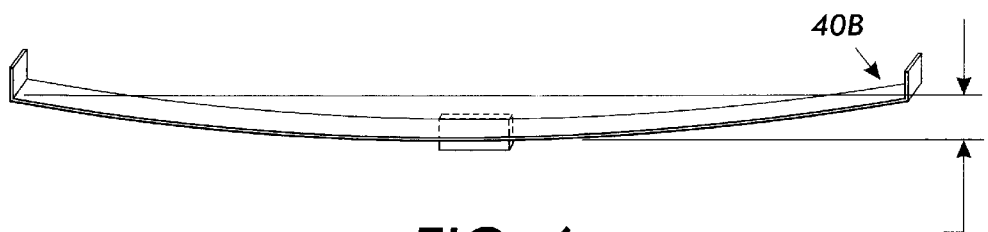
FIG. 6 is a perspective view of a second spreader spring for use in an embodiment of the present invention.

Turning now to FIG. 4, another aspect of the present invention is shown by spring 40. FIG. 4 shows an elevated orthogonal view of attenuator 20 having gap or slot 22 as shown in FIG. 2. In order to increase the pressure of attenuator 20 against the inside diameter of the photoreceptor, tensioning or spreader spring 40 has been added to ensure that slot 22 remains as spread as possible against the photoreceptor. FIGS. 5 and 6 show perspective views of possible tensioning springs 40A and 40B. Other embodiments are possible. As shown in FIG. 4, each of 40A and 40B achieves the intended result of supplementing the spring tension of radius 21 (shown in FIG. 2). One of the advantages of such supplemental spring 40 is that attenuator 20 can more reliably be reused when photoreceptor drums are returned to vendors for remanufacturing. Such return and replacement are common practices in the printer/copier industry, especially since photoreceptors are often packaged inside so-called Customer Replaceable Cartridges designed as modules that can be handled and returned for a refund by customers. Spring 40 allows attenuators to be withdrawn from the inside of a photoreceptor drum and reused multiple times without wearing out the combined spring action caused by radius 21 and spring 40. Of particular note in conjunction with FIG. 4 is that the sidewalls of conventional attenuators have been too thin (less than 4 mm) to enable springs with sufficient strength to be reliably attached by placement within the 4 mm tolerance provided by the thin sidewalls. The thicker sidewalls offered by the inventive process nearly doubles this manufacturing tolerance and enables use of a wider spring 40.

In sum, an innovative injection molding process has been described in relation to parts requiring a zero draft after molding. Thicker walls of such parts with such zero draft can be molded using the structural foam technique of the present invention. When this technique is applied to noise attenuators used electrophotographic printers and copiers, further advantages result. Specifically, thicker walls enable more flexibility in designing and manufacturing the amount of spring action of the attenuator resin. Also, thicker walls enable assembly of an optional and innovative supplemental spring action. The innovative application of structural foam molding techniques to attenuators further results in greater productivity, decreased costs, and use of less resin material. When compared to the extrusion techniques of the prior art, a significant number of handling and finishing steps are eliminated. The overall result is a better and considerably lower cost noise attenuator part.

It is, therefore, evident that there has been provided in accordance with the present invention an innovative application of low pressure injection molding techniques to zero draft parts and to innovative noise attenuators that result therefrom. This innovative process and part fully satisfies the aims and advantages set forth above. While the invention has been described in conjunction with several embodiments, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. An improved process for manufacture of parts having a zero draft side, comprising:
    (a) making an injection mold having an end-cap mold section and a cavity mold section that together form a cavity conforming to a zero draft part having a wall thickness greater than 4 millimeters;
    (b) injecting resin material into the mold;
    (c) foaming the resin material;
    (d) separating the end-cap section from the cavity section; and
    (e) removing the part from the mold.

2. The process of claim 1, wherein the resin material is foamed while in the mold.

3. The process of claim 1, further comprising the step of using the part without removing any resin material from the part after its removal from the mold.

4. The process of claim 1, wherein the step of making an injection mold further comprises making the portion of the mold conforming to the outside surface of the part with a draft less than 0.50 degree.

5. The process of claim 1, wherein the step of making an injection mold further comprises making the portion of the mold conforming to the outside surface of the part with a draft less than 0.25 degree.

6. The process of claim 1, wherein the step of making an injection mold further comprises making the portion of the mold conforming to the outside surface of the draft part with a draft less than plus or minus 0.1 degree.

7. The process of claim 1, wherein the step of making an injection mold further comprises making the portion of the mold conforming to the outside surface of the part with a zero draft and the actual varies from a zero draft within normal manufacturing tolerance of an injection mold.

* * * * *